Patented Mar. 20, 1934

1,951,577

UNITED STATES PATENT OFFICE 1,951,577

PRODUCTION OF MONO AND DICHLOR ISOMERS OF DIPHENYL

John E. Malowan, Anniston, Ala., assignor to Swann Research, Incorporated, a corporation of Alabama No Drawing. Application September 6, 1932, Serial No. 631,754

16 Claims. (Cl. 260—161)

This invention relates to the production of mono and dichloro isomers of diphenyl by chlorination. One object of this invention is the provision of a process by which increased yields of the monochlor and dichlordiphenyls may be obtained. Another object is the provision of a process by which diphenyl is chlorinated in a solvent having a boiling point above that of the monochlorodiphenyl isomers, in order to facilitate separation thereof. Other objects and advantages will become apparent as the disclosure proceeds.

It is already known that diphenyl can be chlorinated for the production of the monochlor isomers, either by passing chlorine directly into the molten hydrocarbon or by dissolving it first in a solvent such as benzene, toluene or the liquid mono and dihalogenated derivatives of benzene or toluene, and then chlorinating such solution.

In the first-mentioned known method, the yields of the monochlor diphenyls obtained are comparatively low, due to the formation of large quantities of higher chlorinated diphenyls as well as to the fact that relatively large quantities of the original diphenyl are not chlorinated.

The objections to the second known method are in general similar to those above mentioned and in addition from a commercial standpoint it is objectionable because it is necessary to distill a large quantity of the volatile solvent before the monochlordiphenyls can be distilled.

It is particularly desirable that a more efficient method of obtaining the monochlor and the dichlor isomers of diphenyl be devised. The 2- and 4-chlordiphenyl are useful as a starting point for the manufacture of the corresponding hydroxy or amino compounds. The dichlor isomer of diphenyl which is of greatest interest is the 4-4'-dichlordiphenyl which is useful as a starting material for the manufacture of benzidine.

I have now discovered that diphenyl may be chlorinated if first dissolved in a liquid higher chlorinated diphenyl and high yields of the monochlor or dichlor isomer obtained without further chlorinating such solvent. I have also found that a not inconsiderable saving results upon subsequent distillation of the monochlor isomers because of the fact that such isomers are readily distilled from the chlorination product at a boiling point below that of the higher chlorinated diphenyl which has been used as a solvent.

The higher chlorinated diphenyls which are liquid and which are used as a solvent for the diphenyl during chlorination, are those chlorinated diphenyls having two or more chlorine atoms substituted in the diphenyl nucleus. A liquid chlorinated diphenyl which is suitable for use as a solvent will contain in the neighborhood of 32 percent of substituted chlorine and may be prepared in the following manner:—

Example I

Chlorinate diphenyl by passing chlorine gas into the hydrocarbon above its melting point. Iron filings are added to the diphenyl to catalyze the chlorination reaction. After chlorination has started, the temperature of the diphenyl may be reduced to 40° C. or lower by passing cold water thru cooling coils submerged in the reacting mass. I have found that if the temperature be maintained somewhat above the freezing temperature of the reacting mass, chlorination proceeds somewhat slower, but a good yield of 4-4'-dichlordiphenyl may be obtained upon cooling. Chlorination is continued until a chlorine content in the neighborhood of 32 percent is reached, at which point the flow of gas is interrupted and chlorination is complete. Upon cooling the reaction mixture to 20° C. or lower, crystals of 4-4'-dichlordiphenyl separate out. These may be filtered or otherwise separated from the mother liquor, and represent in amount a yield of approximately 30% of the original diphenyl. The mother liquor after separation of the 4-4'-dichlordiphenyl has a specific gravity in the neighborhood of 1.259 at 65° C./65° C., and a freezing point considerably below 20° C. This mother liquor is suitable for use as a solvent medium for further chlorination of diphenyl, as will hereinafter more fully appear.

Due to the low freezing point of the chlorinated diphenyl mother liquor the solution made therefrom will remain fluid at low temperatures, and especially at temperatures in the neighborhood of 20° C. Since most chemical plants are supplied with cooling water near this temperature, it will be convenient to use such water for cooling purposes, altho it is not to be supposed that lower temperatures may not be profitably employed. My process, however, can thus take advantage of the usual conditions existing in chemical plants, without the necessity of depending upon extreme low temperatures, for the production of which refrigerating plants are required.

An example of such use will be apparent from the following procedure illustrating one method by which higher yields of 4-4'-dichlordiphenyl may be produced:—

Example II

Dissolve one part of diphenyl in four parts by weight of the mother liquor and chlorinate the solution in the presence of iron filings at a temperature of 40° C. or below until the reaction product again contains in the neighborhood of 32 percent of chlorine. Since the freezing point of the solution of diphenyl in the mother liquor is quite low, being below −10° C., the reaction mixture may be maintained at a temperature considerably below 40° C. without danger of crystallization of the mother liquor. However, as the chlorination reaches the dichlor stage, crystals of 4-4'-dichlordiphenyl begin to separate out. Upon completion of chlorination, the chlorinated product is cooled to 20° C. or below and the separated crystals removed by filtration or otherwise without removing appreciable mother liquor or other isomers. The yield of the 4-4' isomer will be in the neighborhood of 40 percent of the diphenyl added.

An example of the use of the above-mentioned mother liquor for the chlorination of diphenyl in the production of the monochlor isomers is given in the following:—

Example III

Dissolve one part of diphenyl in four parts of the mother liquor mentioned above and which has a specific gravity of 1.259 at 65°/65° C. The resulting solution will have a specific gravity of 1.203 at 65°/65° C. Chlorinate the solution, using iron filings as a catalyst, at a temperature of 35° C. or below, until the solution has a specific gravity of 1.232 at 65°/65° C. The chlorinated product is then subjected to fractional distillation. The products obtained will consist of: unchanged diphenyl, 20 precent; monochlordiphenyls equivalent to 80% of the original diphenyl; higher chlorinated diphenyls, none. The monochlordiphenyls comprise: 2-chlordiphenyls 62.5% and 4-chlordiphenyls 37.5%.

Some variation in the extent of chlorination is, of course permissible. If a greater amount of chlorine be introduced into the solution of Example III, a somewhat larger amount of diphenyl will be chlorinated, but some dichlordiphenyls will be produced. If a lesser amount of chlorine be introduced, a larger amount of diphenyl remains unchlorinated.

From the above examples it will be seen that my invention provides a process for the chlorination of diphenyl by which a more uniform chlorination may be obtained than was hitherto possible, and which is not complicated by the distillation of volatile solvents, in which such chlorinations have hitherto been conducted.

The separation of the desired isomers can be effected in a simple and economical manner, as described. The separation of the 4-4'-dichlor isomer is accomplished by crystallization, whereby it is obtained in a relatively pure state. The separation of the monochlor isomers is effected most conveniently by fractional distillation, since they boil at a lower temperature than the solvent in which they have been chlorinated. They may also, if desired, be separated one from the other by fractional distillation because of the difference in boiling point. The 2-chlordiphenyl boils at 267°-268° C.; the 4-chlordiphenyl boils at 282° C., while the liquid chlorinated diphenyl suitable for use as a solvent boils above 293° C.

While I have described only three embodiments of my invention, it will be apparent to those skilled in the art that it is not so limited, but that it is susceptible of various changes and modifications without departing from the spirit thereof, and I desire that only such limitations shall be placed thereupon as may be imposed by the prior art, or as are specifically set forth in the appended claims.

What I claim is:—

1. A process for the production of chlorine derivatives of diphenyl, comprising dissolving diphenyl in a liquid mixture of higher chlorinated diphenyls and then chlorinating said diphenyl while in solution.

2. A process for the production of chlorine derivatives of diphenyl, comprising dissolving diphenyl in a liquid mixture of higher chlorinated diphenyls having a freezing point substantially below 20° C. and then chlorinating said diphenyl while in solution.

3. A process for the production of monochlor isomers of diphenyl, comprising dissolving diphenyl in a liquid mixture of higher chlorinated diphenyls, chlorinating said diphenyl while in solution and then separating said monochlor isomers by fractional distillation.

4. A process for the production of monochlor isomers of diphenyl, comprising dissolving diphenyl in a liquid mixture of higher chlorinated diphenyls having a freezing point substantially below 20° C., chlorinating said dissolved diphenyl at a temperature below 35° C. and separating said monochlor isomers by fractional distillation.

5. In a process for the production of chlorine derivatives of diphenyl, in which chlorine and diphenyl dissolved in a liquid mixture of higher chlorinated diphenyls are reacted to form chlorine substitution products thereof, the step of separating the 4-4'-dichlor isomer by crystallization from said liquid mixture of higher chlorinated diphenyls by cooling the reaction product below 20° C. and removing said isomer from the mother liquor.

6. A process for the production of chlorine derivatives of diphenyl, comprising dissolving diphenyl in a liquid mixture of higher chlorinated derivatives of diphenyl having a freezing point substantially below 20° C., chlorinating said dissolved diphenyl, cooling the reaction product below 20° C. ad removing the crystalline 4-4'-dichlordiphenyl derivative from the mother liquor.

7. In the process defined in claim 6, the steps of dissolving diphenyl in the mother liquor from which crystals of 4-4'-dichlordiphenyl have been removed, in the proportion of one part of diphenyl to four parts of mother liquor and then chlorinating the solution to produce the monochlor isomers.

8. In the process defined in claim 6, the steps of dissolving diphenyl in the mother liquor from which crystals of 4-4'-dichlordiphenyl have been removed, and then chlorinating the solution at a temperature below 40° C. to produce the monochlor isomers.

9. A process for the production of chlorine derivatives of diphenyl comprising dissolving diphenyl in a liquid mixture of higher chlorinated diphenyls of approximately 1.259 specific gravity at 65°/65° C., chlorinating the solution until sufficient chlorine has been combined with the dissolved diphenyl to form the dichlordiphenyl, then cooling the product to crystallize the 4-4'-dichlordiphenyl derivative, and separating the same from the mother liquor.

10. A process for the production of monochlor isomers of diphenyl, comprising dissolving diphenyl in a liquid mixture of higher chlorinated diphenyls of approximately 1.259 specific gravity at 65°/65° C., chlorinating the solution, and then separating the monochlor isomers from the solution by fractional distillation.

11. A process for the production of monochlor isomers of diphenyl, comprising dissolving diphenyl in a liquid mixture of higher chlorinated diphenyls of approximately 1.259 specific gravity at 65°/65° C., chlorinating diphenyl in the solution until approximately 80% of the dissolved diphenyl has been chlorinated and then separating the unchanged diphenyl and the monochlor isomers from the solution by fractional distillation.

12. Process for the production of monochlor isomers of diphenyl, comprising dissolving diphenyl in a liquid mixture of chlorinated diphenyls, said mixture having a boiling point substantially higher than said monochlor isomers, and then chlorinating the dissolved diphenyl.

13. Process for the production of monochlor isomers of diphenyl, comprising dissolving diphenyl in a liquid mixture of chlorinated diphenyls, said mixture having a boiling point substantially higher than that of said monochlor isomers and a freezing point substantially below 20° C., and then chlorinating the dissolved diphenyl.

14. Process for the production of 4-4'-dichlorodiphenyl, comprising dissolving diphenyl in a liquid mixture of higher chlorinated diphenyls having a boiling point substantially higher than the monochlorodiphenyls and chlorinating said diphenyl to form the said dichlorodiphenyl.

15. Process for the production of 4-4'-dichlorodiphenyl comprising dissolving diphenyl in a liquid mixture of higher chlorinated diphenyls having a freezing point below 20° C. and then chlorinating said diphenyl to form the said dichlor isomer.

16. Process for the production of the monochlor isomers of diphenyl comprising dissolving diphenyl in a liquid mixture of higher chlorinated diphenyls having a boiling point above that of the monochlor isomers, chlorinating said dissolved diphenyl, and then separating said monochlor isomers from the higher chlorinated diphenyls by distillation.

JOHN E. MALOWAN.